Aug. 14, 1945.   J. LEFLAR ET AL   2,381,914
MOTOR HOUSING
Filed March 26, 1940   2 Sheets-Sheet 2
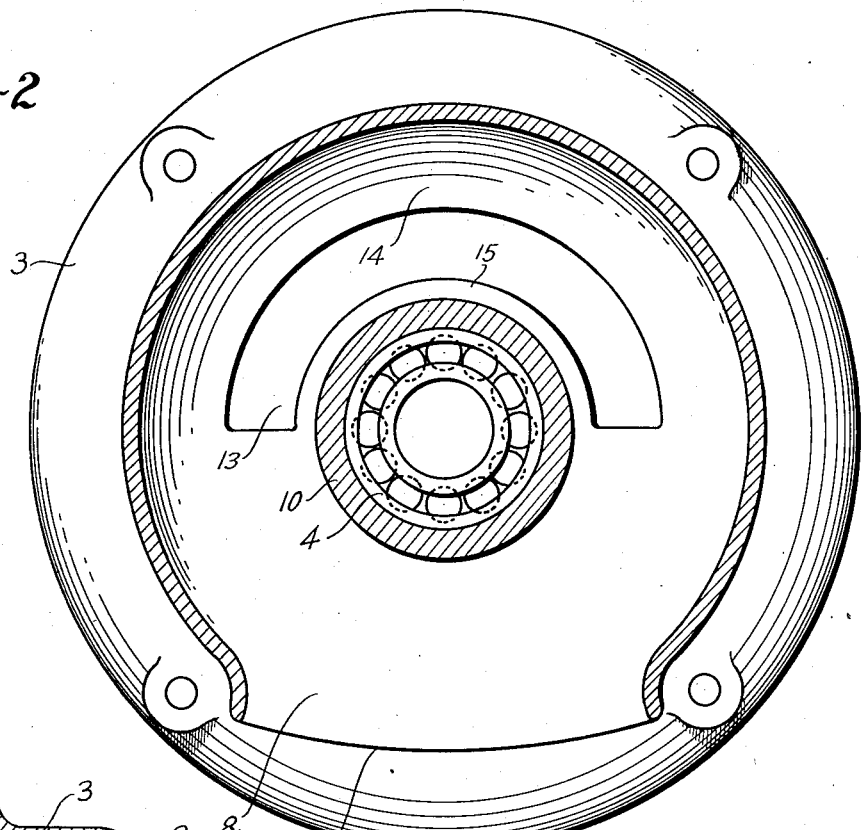
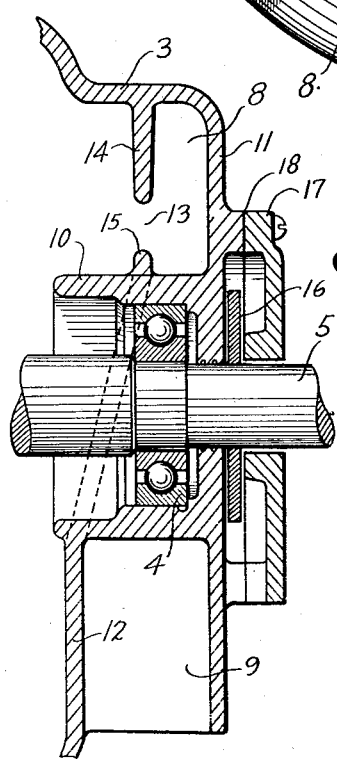
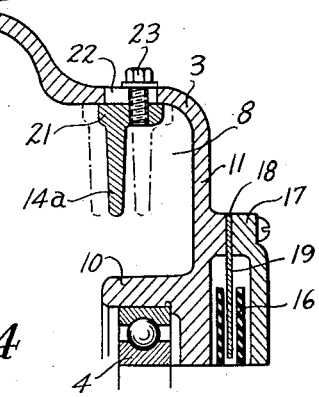
Inventor
Jerome Leflar
Victor L. Darnell
By F. L. Walker
Attorney Patented Aug. 14, 1945

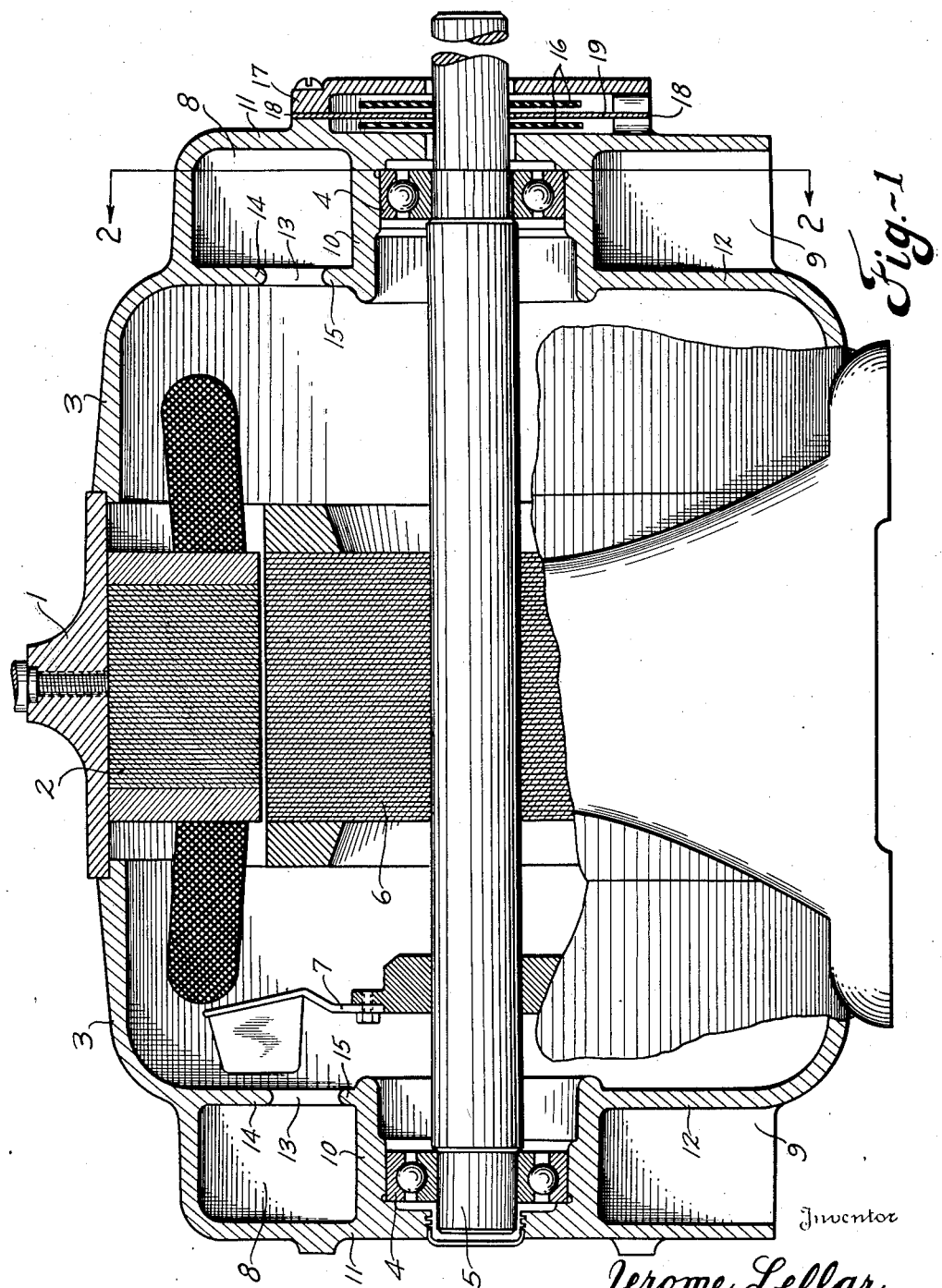

2,381,914

UNITED STATES PATENT OFFICE 2,381,914

MOTOR HOUSING

Jerome Leflar and Victor L. Darnell, Dayton, Ohio, assignors to The Master Electric Company, Dayton, Ohio, a corporation of Ohio Application March 26, 1940, Serial No. 326,036

7 Claims. (Cl. 172—36)

This invention pertains to dynamo-electric machines, and more particularly to a semi-enclosed or "splash-proof" housing therefor, constructed and arranged to intercept and trap entrained moisture carried into the housing by the ventilating air before it reaches the motor windings.

Electric motors and generators are many times installed in surroundings wherein they are exposed to moisture and to water drip and splash, as in mining operations, drainage projects, hydraulic pump actuation, and the like. Electric motors are used in laundries, on domestic washing machines, and similar installations where moisture entrained air is likely to enter the motor housing if not intercepted in its course thereto. In dairy, brewery, and similar installations, where sanitation is of prime importance, it is not unusual to turn a water hose directly on a motor while cleaning in its vicinity.

One of the problems of motors for such purposes is to provide ventilating openings of sufficient size to enable proper cooling without exposing the motor windings to moisture attack. The present electrical motor or generator housing has been designed with a tortuous air passage and such disposition of baffles as to permit maximum air circulation therethrough while limiting to minimum the entrance of entrained moisture.

One source of considerable difficulty has been seepage of moisture along the motor or generator shaft. In the present instance, intercepting baffles supplemental to the ventilating passage baffles have been provided upon the shaft, by which this course is closed to the entrance of water.

The object of the invention is to improve the construction of "splash-proof" motor housings, as well as the means and mode of intercepting and excluding moisture, which may not only be economically manufactured, but will be more efficient in use, automatic in operation, uniform in action, having but few parts and unlikely to get out of repair.

A further object of the invention is to provide moisture intercepting means in the heads of motor or generator housings without materially changing the conventional dimensions or shape of the housing heads.

A further object of the invention is to provide positive protective means for the shaft opening to the housing to exclude seepage.

A further object of the invention is to provide a motor structure having the advantageous structural features and inherent meritorious characteristics herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is shown the preferred but obviously not necessarily the only form of embodiment of the invention, Fig. 1 is a longitudinal sectional view of an electric motor in which the present invention has been embodied. Fig. 2 is a sectional view on line 2—2 of Fig. 1. Fig. 3 is a vertical longitudinal sectional view of one end of the motor. Fig. 4 is a similar detail sectional view illustrating a modification.

Like parts are indicated by similar characters of reference throughout the several views.

The invention is herein shown applied to an electric motor, of which 1 is the medial housing section surrounding the field ring 2, and 3—3 are the casing heads or end bells in which is journaled, in suitable anti-friction bearings 4, rotor shaft 5, carrying the armature 6. Mounted within the casing upon the armature shaft 5 is a rotary fan element 7, which effects circulation of air through the housing or casing by drawing it in through one head or end bell 3 and expelling it through the other. The ventilating current of air may be made to flow in either direction, according to the disposition of the blades of the fan element 7.

Each of the heads or end bells 3 is formed with a vestibule or antechamber 8, communicating with atmosphere through its open bottom 9. The chamber 8 is interrupted by the bearing boss 10 formed integral with the outer wall 11 of the head and extending thence across the chamber 8 and connected with the inner wall 12 throughout at least the lower half of the bearing boss. The chamber 8 communicates with the interior of the main compartment of the motor housing through a semi-circular arcuate opening 13 spaced from the top of the chamber 8. The upper portion of the inner wall 12 of the head comprises a dependent semi-circular baffle flange 14. A corresponding concentric baffle flange 15 may be provided about the upper half of the bearing boss 10 in a plane common with the baffle flange 14.

The construction is such that the moisture laden air entering through the open bottom 9 is intercepted by the bottom of the bearing boss and is diverted laterally through the slot-like arcuate opening 13 into the motor compartment of the casing. Any particles of moisture carried by the incoming air current will resist the abrupt change of direction and by centrifugal influence will be caused to impinge upon the baffle flange 15 and be so arrested. At the same time, heavier particles of entrained moisture which may have settled somewhat by gravity to the bottom of the air stream will be arrested by the lower baffle flange 15. Thus the entrained moisture will have been separated from the air stream before the latter enters the motor chamber.

To exclude such moisture as may otherwise seep into the motor casing along the armature shaft, one or more slinger rings are mounted on the shaft within a supplemental chamber surrounding the extension of the shaft beyond the bearing boss 10 at the power side of the motor.

In Fig. 1 there are shown two slinger rings 16, which may be of rubber, fiber, metal, or other suitable material, mounted on the shaft and enclosed within a supplemental housing 17 open at 18. To facilitate assembly of the slinger ring on the shaft, the supplemental housing 17 is separately formed and attached to the outer face of the end bell or head of the motor casing. In the event that two slinger rings are employed, as shown in Fig. 1, a division plate or septum 19 is interposed between the removable housing member 17 and the casing head and in a plane intermediate the slinger rings 16, thus dividing the supplemental housing into separate chambers. In event that only one slinger ring 16 is employed, as shown in Fig. 3, the division plate is omitted.

By the use of one or more slinger rings within the supplemental housing 17, it is unnecessary to provide a close running fit of the shaft within the outer wall 11 of the casing head or in the wall of the supplemental housing 17. Such construction enables the shaft openings to be left unfinished, or at most merely reamed or rough finished, thus reducing the necessary machining operations and the cost of manufacture. Whatever moisture leaks through the clearance space 20 surrounding the shaft as it projects through the wall of the supplemental housing 17 is intercepted by the enclosed slinger ring, and is discharged therefrom within the housing 17 and drains through the open bottom 18. If any seepage gets beyond the first slinger ring, which is quite unlikely, it is intercepted and discharged by the second ring 16. For ordinary commercial operation, a single intercepter or slinger ring 16 as shown in Fig. 3 is found amply sufficient.

To meet different conditions of use it may be desirable to adjust at least one of the baffle flanges axially of the casing. In Fig. 4 there is shown a variation wherein in lieu of the fixed baffle flange 14 an arcuate member 14a is adjustably mounted in the top of the chamber 8. The member 14a is formed with a flange 21 of sufficient extent to overlap and close a slot 22 in the wall of the head, through which the adjustable baffle is secured by a clamp screw 23.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. In a splash-proof dynamo-electric machine, a casing, a head therefor including relatively spaced walls, a vestibule chamber open at its bottom therebetween, a bearing hub interconnecting the spaced walls, there being an intercommunicating opening between the vestibule chamber and the interior of the casing in spaced relation above the bearing hub, baffle flanges disposed above and below said opening, a rotary shaft mounted in the bearing hub and extending beyond the head, a supplemental chamber open at its bottom through which the shaft extends beyond the bearing hub, a division wall within the supplemental chamber dividing said chamber into separate compartments, the openings in the outer wall and the division wall of said supplemental chamber being materially larger than the shaft, affording clearance spaces thereabout, and slinger rings carried by the shaft in each compartment of the supplemental chamber for intercepting moisture entering through the clearance spaces.

2. In a dynamo-electric machine, a casing, a head therefor, a vestibule chamber in said head open at its bottom and having an opening communicating with the interior of the casing, a bearing hub within the chamber intermediate the openings therein, the construction and arrangement being such that the passage of air from the open bottom to the intercommunicating opening is interrupted and incoming air currents are directed through a tortuous path, baffle areas at both the top and bottom of the intercommunicating opening between the chamber and the interior of the casing, a shaft mounted in the bearing hub and projecting beyond the head, a supplemental chamber having a drain opening therein formed in said head beyond the vestibule chamber and through which the shaft extends, and a slinger ring upon the shaft within said supplemental chamber for intercepting and discharging moisture entering the supplemental chamber.

3. In a dynamo-electric machine, a ventilated casing, a head therefor including inner and outer relatively spaced walls, a vestibule chamber formed intermediate said walls and open to atmosphere at its bottom, a bearing boss interconnecting the inner and outer walls of the head concentrically with the axis of the casing, the inner wall of the head having therein an arcuate slot intermediate the bearing boss and the top of the vestibule chamber, through which chamber communicates with the interior of the casing, a pair of spaced arcuate baffle flanges defining said arcuate slot comprising a dependent flange projecting downwardly from the top of the vestibule chamber and an upstanding flange projecting upwardly from the bearing boss.

4. In a dynamo-electric machine, a casing, a head therefor including a shaft mounting, a chamber on the exterior of said head having a drain opening, a wall dividing the chamber into separate compartments, a shaft in said mounting extending through the compartments of said chamber, and plural slinger rings, one in each compartment, intercepting and discharging moisture entering the chamber from the exterior of the assembly.

5. In a dynamo-electric machine, a casing, a head therefor, a chamber in said head having an opening to atmosphere and an opening communicating with the interior of the casing, a bearing hub intersecting the chamber intermediate the respective openings, and an adjustable baffle member in said chamber movable axially of the casing into different positions to intercept moisture laden air entering the chamber prior to its entrance thence to the casing.

6. In a dynamo-electric machine, a casing, a head therefor having an air passage therethrough communicating with atmosphere and with the interior of the casing, a bearing supported in the head, a shaft mounted in the bearing and projecting therebeyond, a chamber formed in the head the walls of which are apertured to permit the extension of the shaft therethrough in spaced concentric relation therewith, a pair of spaced rotary discs carried by the shaft within the chamber for intercepting and discharging moisture entering the chamber, and a baffle within the chamber intermediate the spaced discs.

7. In a dynamo-electric machine, a casing, a head therefor including relatively spaced walls, a vestibule chamber between the walls having an opening to atmosphere, a bearing hub intersecting the vestibule chamber, the inner wall of said chamber having therein an opening communicating with the interior of the casing above the level of the bearing hub in intermediate spaced relation with the bearing hub and the top of the vestibule chamber and a dependent baffle area of said wall extending downwardly from the top of the vestibule chamber, and an upstanding baffle area of said wall projecting upwardly from the bearing hub and defining therebetween the opening communicating with the casing.

JEROME LEFLAR.
VICTOR L. DARNELL.